(12) United States Patent
Scheidegger et al.

(10) Patent No.: US 12,555,214 B2
(45) Date of Patent: Feb. 17, 2026

(54) OBTAINING REALISTIC BOUNDARIES OF STRUCTURAL DEFECTS OF MATERIALS IN IMAGES OF STRUCTURES

(71) Applicant: INTERNATIONAL BUSINESS MACHINES CORPORATION, Armonk, NY (US)

(72) Inventors: Florian Michael Scheidegger, Dietlikon (CH); Dhruti Nilesh Shah, Chavannes-pre-Renens (CH); Adelmo Cristiano Innocenza Malossi, Schönenberg (CH)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 18/167,477

(22) Filed: Feb. 10, 2023

(65) Prior Publication Data

US 2024/0273697 A1    Aug. 15, 2024

(51) Int. Cl.
*G06T 7/00* (2017.01)
*G06T 5/70* (2024.01)
(Continued)

(52) U.S. Cl.
CPC ............. *G06T 7/0002* (2013.01); *G06T 5/70* (2024.01); *G06T 7/12* (2017.01); *G06T 7/155* (2017.01);
(Continued)

(58) Field of Classification Search
CPC ........... G06T 7/0002; G06T 5/70; G06T 7/12; G06T 7/155; G06T 7/162; G06T 7/194;
(Continued)

(56) References Cited

U.S. PATENT DOCUMENTS 8,774,515 B2    7/2014  Mensink
2017/0132826 A1  5/2017  Grady
(Continued)

FOREIGN PATENT DOCUMENTS

CN    110993064 A    4/2020
EP     3049971 B1   11/2018

OTHER PUBLICATIONS

Achanta, et al., "SLIC Superpixels," EPFL Technical Report 149300 [publication], Jun. 2010, 15 pages, Retrieved from the Internet: <URL: https://infoscience.epfl.ch/record/149300>.
(Continued)

*Primary Examiner* — Stephen R Koziol
*Assistant Examiner* — Michael Kim Maiden
(74) *Attorney, Agent, or Firm* — Robert D. Bean

(57) ABSTRACT

According to embodiments, a method, computer system, and computer program product for obtaining boundaries of structural defects of materials in images of structures is provided. The present invention may include loading an image of a structure made of a material having one or more structural defects and running a pipeline according to certain processing parameters. Running the pipeline pre-processes the loaded image to obtain an initial segmentation mask, where the mask defines an initial boundary of the crack. Based on the initial segmentation mask obtained, a graph of a skeletal structure of the crack is generated, where the skeletal structure comprises a backbone and outer substructures. The graph is pruned by cutting away one or more outer subgraphs corresponding to respective outer substructures to obtain a revised skeletal structure. A revised boundary of the crack is obtained based on both the loaded image and the revised skeletal structure.

20 Claims, 7 Drawing Sheets

(51) Int. Cl.
  *G06T 7/12* (2017.01)
  *G06T 7/155* (2017.01)
  *G06T 7/162* (2017.01)
  *G06T 7/194* (2017.01)
  *G06T 11/60* (2006.01)
  *G06V 10/26* (2022.01)
  *G06V 20/70* (2022.01)

(52) U.S. Cl.
  CPC .............. *G06T 7/162* (2017.01); *G06T 7/194* (2017.01); *G06T 11/60* (2013.01); *G06V 10/26* (2022.01); *G06V 20/70* (2022.01); *G06T 2200/24* (2013.01); *G06T 2207/20021* (2013.01); *G06T 2207/20044* (2013.01); *G06T 2207/20081* (2013.01); *G06T 2207/20092* (2013.01); *G06T 2207/30184* (2013.01)

(58) Field of Classification Search
  CPC ................. G06T 11/60; G06T 2200/24; G06T 2207/20081; G06T 2207/20092; G06T 2207/30184; G06T 2207/20072; G06V 10/26; G06V 20/70
  See application file for complete search history.

(56) References Cited

U.S. PATENT DOCUMENTS

| | | | | |
|---|---|---|---|---|
| 2020/0364849 | A1* | 11/2020 | Zhang | G06T 7/155 |
| 2022/0261599 | A1 | 8/2022 | Kastaniotis | |
| 2023/0014823 | A1* | 1/2023 | Cheng | G06T 7/0004 |
| 2023/0080178 | A1* | 3/2023 | Hajjar | G06T 7/0004 382/106 |
| 2024/0265676 | A1* | 8/2024 | Janoušková | G06N 3/045 |

OTHER PUBLICATIONS

Blanco, et al., "Artificial intelligence: Construction technology's next frontier," McKinsey & Company [online], Apr. 4, 2018 [accessed on Jan. 10, 2023], 14 pages, Retrieved from the Internet: <URL: https://www.mckinsey.com/capabilities/operations/our-insights/artificial-intelligence-construction-technologys-next-frontier>.

Cerna, "Image Annotation Tools: Which One to Pick in 2020?", Bohemian AI [blog], Feb. 11, 2020 [accessed on Jan. 10, 2023], 13 pages, Retrieved from the Internet: <URL: https://bohemian.ai/blog/image-annotation-tools-which-one-pick-2020/>.

CVAT, "Open Data Annotation Platform," cvat.ai [datasheet], [accessed on Jan. 23, 2023], 7 pages, Retrieved from the Internet: <URL: https://www.cvat.ai/>.

Dias, et al., "FreeLabel: A Publicly Available Annotation Tool based on Freehand Traces," 2019 IEEE Winter Conference on Applications of Computer Vision (WACV), Mar. 11, 2019, 10 pages, arXiv:1902.06806v2, Retrieved from the Internet: <URL: https://arxiv.org/abs/1902.06806>.

Eschen, "IBM to Develop an AI-Powered IoT Solution to Help Clients Manage and Monitor Aging Bridges, Tunnels, Highways and Railways," IBM Newsroom [online], Apr. 24, 2019 [accessed on Jan. 10, 2023], 2 pages, Retrieved from the Internet: <URL: https://newsroom.IBM.com/2019-04-24-IBM-to-Develop-an-AI-Powered-IoT-Solution-to-Help-Clients-Manage-and-Monitor-Aging-Bridges-Tunnels-Highways-and-Railways>.

He, et al., "Mask R-CNN," Computer Vision and Pattern Recognition [journal], Jan. 24, 2018, 12 pages, arXiv:1703.06870v3, Retrieved from the Internet: <URL: https://arxiv.org/abs/1703.06870>.

IBM Newsroom, "Meet IBM Maximo for Civil Infrastructure," IBM.com [online], Nov. 2, 2020 [accessed on Jan. 10, 2023], 3 pages, Retrieved from the Internet: <URL: https://newsroom.IBM.com/Video-Meet-IBM-Maximo-for-Civil-Infrastructure>.

IBM, "Find a product," IBM [online], [accessed on Jan. 10, 2023], 3 pages, Retrieved from the Internet: <URL: https://www.ibm.com/ch-de/marketplace/ibm-visual-insights>.

IBM, "Find a product," IBM [online], [accessed on Jan. 10, 2023], 3 pages, Retrieved from the Internet: <URL: https://www.ibm.com/products>.

IBM, "IBM Maximo Application Suite: Remote asset monitoring," IBM.com [online], [accessed on Jan. 10, 2023], 6 pages, Retrieved from the Internet: <URL: https://www.ibm.com/products/maximo/remote-monitoring#/section-heading-4>.

Jsbroks, "Awesome Dataset Tools," GitHub [online], Oct. 3, 2022 [accessed on Jan. 10, 2023], 5 pages, Retrieved from the Internet: <URL: https://github.com/jsbroks/awesome-dataset-tools>.

Abelbox, "The data engine for AI," Labelbox.com [datasheet], [accessed on Jan. 10, 2023], 7 pages, Retrieved from the Internet: < URL: https://labelbox.com/>.

Maryt_Intel, "New Computer Vision Tool Accelerates Annotation of Digital Images and Video," Intel [online], Dec. 20, 2019 [accessed on Jan. 23, 2023], 3 pages, Retrieved from the Internet: <URL: https://community.intel.com/t5/Blogs/Tech-Innovation/Artificial-Intelligence-AI/New-Computer-Vision-Tool-Accelerates-Annotation-of-Digital/post/1335704>.

Opencv, "cvat," GitHub [online], [accessed on Jan. 10, 2023], 8 pages, Retrieved from the Internet: < URL: https://github.com/opencv/cvat>.

Rizzoli, "13 Best Image Annotation Tools of 2023 [Reviewed]," V7 Platform [blog], Jan. 3, 2023 [accessed on Jan. 10, 2023], 29 pages, Retrieved from the Internet: <URL: https://www.v7labs.com/blog/best-image-annotation-tools>_.

Rother, et al., "GrabCut: Interactive Foreground Extraction Using Iterated Graph Cuts," ACM Transactions on Graphics [article], Aug. 2004 [accessed on Jan. 10, 2023], 7 pages, vol. 23, Issue 3, DOI:10.1145/1186562.1015720, Retrieved from the Internet: <URL: https://www.researchgate.net/publication/220184077_GrabCut_Interactive_Foreground_Extraction_Using_Iterated_Graph_Cuts>.

Sayez, et al., "Accelerating the Creation of Instance Segmentation Training Sets Through Bounding Box," Computer Vision and Pattern Recognition [journal], May 23, 2022, 7 pages, Retrieved from the Internet: <URL: https://arxiv.org/abs/2205.11563>.

Screen captures from YouTube video clip entitled "Finding objects in images with IBM Watson Visual Recognition," 2 pages, uploaded on Apr. 18, 2020 by StudyGyaan, Retrieved from the Internet: <URL: https://www.youtube.com/watch?v=5RA_r3CJWU4>.

Screen captures from YouTube video clip entitled "IBM Visual Insights," 2 pages, uploaded on Jan. 28, 2018 by Sachin Lulla, Retrieved from the Internet: <URL: https://www.youtube.com/watch?v=mt10huM-eqw>.

Screen captures from YouTube video clip entitled "IBM Visual Insights: Accessible AI For Visual Inspection - Preview," 2 pages, uploaded on May 13, 2020 by LPA, A Converge Company, Retrieved from the Internet: <URL: https://www.youtube.com/watch?v=3tNEOSoAxsE>.

Sekachev, et al., "Computer Vision Annotation Tool: A Universal Approach to Data Annotation," intel [online], Mar. 2, 2019 [accessed on Jan. 10, 2023], 10 pages, Retrieved from the Internet: <URL: https://www.intel.com/content/www/us/en/developer/articles/technical/computer-vision-annotation-tool-a-universal-approach-to-data-annotation.html>.

Severstal, "Severstal: Steel Defect Detection," kaggle.com [online], [accessed on Jan. 10, 2023], 1 page, Retrieved from the Internet: <URL: https://www.kaggle.com/c/severstal-steel-defect-detection>.

Superannotate, "Powerful annotation tool," SuperAnnotate.com [datasheet], [accessed on Jan. 10, 2023], 5 pages, Retrieved from the Internet: <URL: https://superannotate.com/annotation-tool/>.

Tangseng, et al., "Looking at Outfit to Parse Clothing," Computer Vision and Pattern Recognition [journal], Mar. 4, 2017, 10 pages, arXiv:1703.01386v1, Retrieved from the Internet: <URL: https://arxiv.org/abs/1703.01386>.

Unknown Author, "IBM Maximo for Civil Infrastructure V7.6.1 helps reduce the cost and improves the monitoring of maintaining civil infrastructure, such as roads, rails, bridges, and tunnels," IBM United States Software Announcement 220-084 [online], Mar. 10, 2020 [accessed on Jan. 10, 2023], 10 pages, Retrieved from the

(56) References Cited

OTHER PUBLICATIONS

Internet: <URL: https://www.ibm.com/common/ssi/cgi-bin/ssialias?infotype=AN&subtype=CA&htmlfid=897/ENUS220-084&appname=USN>.
Wiggers, "Intel open-sources CVAT, a toolkit for data labeling," VentureBeat [online], Mar. 5, 2019 [accessed on Jan. 23, 2023], 5 pages, Retrieved from the Internet: <URL: https://venturebeat.com/ai/intel-open-sources-cvat-a-toolkit-for-data-labeling/>.
Zhang, et al., "Methods for Automating Image Annotation From Videos By Iterative Learning," IP.com, Apr. 1, 2019, 15 pages, IP.com No. IPCOM000258032D, Retrieved from the Internet: <URL: https://priorart.ip.com/IPCOM/000258032>.

\* cited by examiner

OBTAINING REALISTIC BOUNDARIES OF STRUCTURAL DEFECTS OF MATERIALS IN IMAGES OF STRUCTURES

BACKGROUND

The present invention relates in general to the field of computer vision. Computer vision is a field concerned with equipping computers with the means to approximate the functionality of the human visual system. In practice, this entails utilizing computers to extract meaningful information from digital images. Extracting meaningful information from an image may entail processing the image into a form that can be better analyzed and interpreted by a computer. While many approaches to the task have been implemented over the past few decades, many challenges exist with respect to the speed and accuracy of computer vision implementations. However, computer vision still stands to realize certain benefits, for example in improving detection of physical defects in image data.

SUMMARY

According to embodiments, a method, computer system, and computer program product for obtaining boundaries of structural defects of materials in images of structures is provided. The present invention may include loading an image of a structure made of a material having one or more structural defects and running a pipeline according to certain processing parameters. Running the pipeline pre-processes the loaded image to obtain an initial segmentation mask, where the mask defines an initial boundary of the crack. Based on the initial segmentation mask obtained, a graph of a skeletal structure of the crack is generated, where the skeletal structure comprises a backbone and outer substructures. The graph is pruned by cutting away one or more outer subgraphs corresponding to respective outer substructures to obtain a revised skeletal structure. A revised boundary of the crack is obtained based on both the loaded image and the revised skeletal structure.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

DETAILED DESCRIPTION OF EMBODIMENTS OF THE INVENTION

Figure 1:
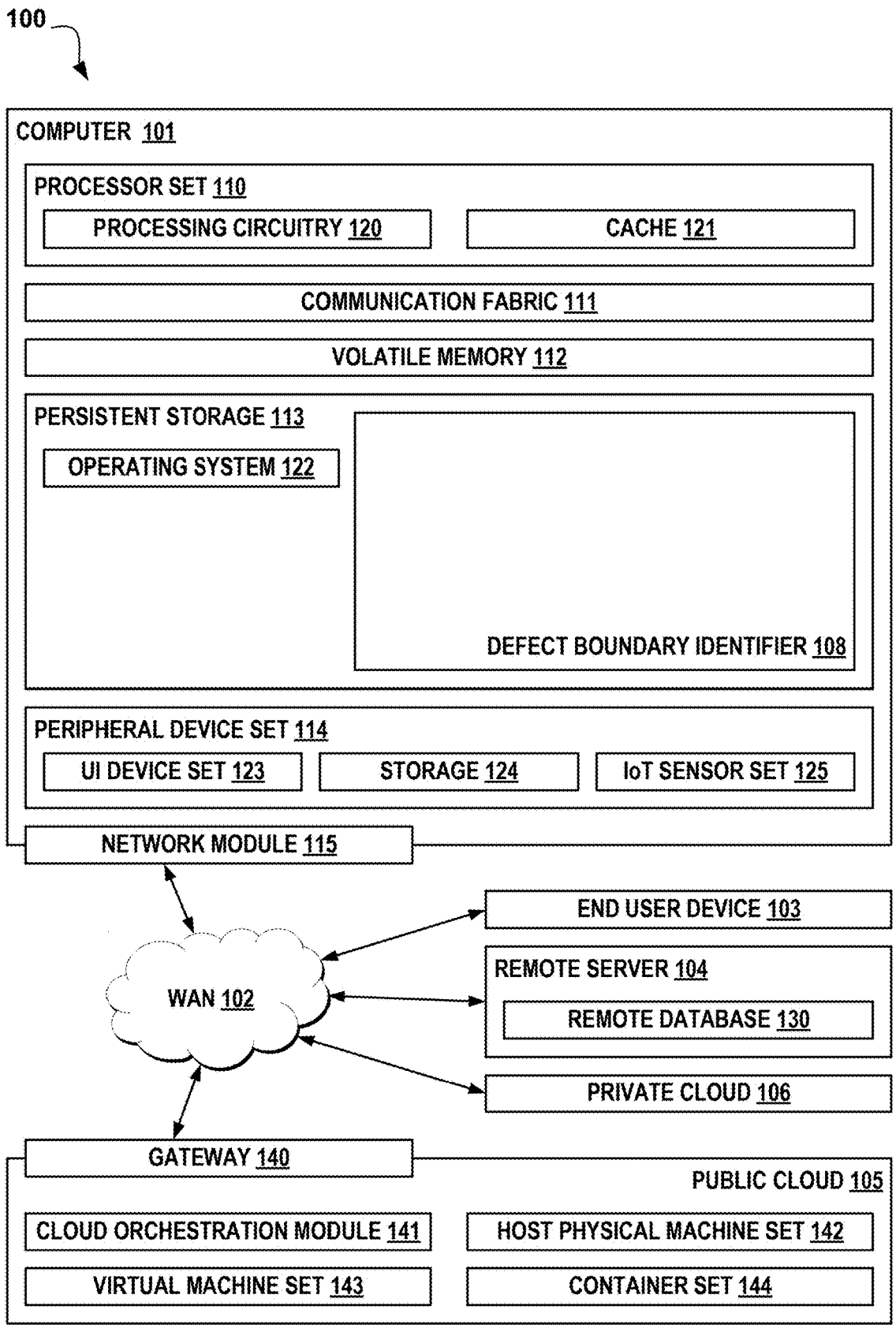
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The present invention relates in general to the field of computer-implemented methods and computer program products for obtaining boundaries of structural defects of materials in images of structures, such as civil engineering structures. In particular, the present invention is directed to methods that generate a graph of a skeletal structure of a crack based on a segmentation mask of an image showing the crack, prune the graph by cutting away outer subgraphs corresponding to outer substructures of the skeletal structure, and reconstruct the boundary of the crack based on both the initial image and the revised skeletal structure.

The machine learning revolution is fueled by data. The training of supervised (or semi-supervised) cognitive models requires labeled data. Ideally, the training data should be devoid of bias and errors. Now, obtaining high-quality labels is often a significant obstacle to real-world applications of cognitive models; for example, the detection and characterization of defects in civil engineering structures often require annotating images, e.g., with carefully drawn region boundaries of structural defects that are visible in the images. The absence of public datasets and pre-trained models may hinder this field of technology. Obtaining high-quality annotations is time-intensive, and thus costly, as such tasks are normally performed by subject matter experts (SMEs).

One possibility to address this issue is to rely on weak supervision techniques, which use data sources to provide supervision signal for labeling the training data in a supervised learning setting. Such techniques alleviate the burden of obtaining hand-labeled data sets. However, in practice, the weak supervision solutions proposed so far are insufficient to fully optimize the time invested by SMEs to label the data.

Embodiments of the proposed method essentially comprise loading an image of a structure and running a pipeline, selected according to certain processing parameters, to obtain a reliable boundary of a structural defect seen in the image. As discussed herein, the loaded image may be referred to as an image of a civil engineering structure, but one skilled in the art would understand that the invention may potentially be applied to various types of images, such as images of objects, machines, characterization images as obtained with microscopy techniques, et cetera. In exemplary embodiments discussed herein, the structure may be assumed to comprise a material having one or more structural defects (e.g., including crack, rust, or spalling, for example) as routinely seen in civil engineering structures such as concrete bridges.

To start with, for example in embodiments where the structural defect is a crack, the loaded image is pre-processed to obtain an initial segmentation mask, which defines an initial boundary of the crack. One or more preprocessing steps may be involved, such as an adaptive thresholding step, a noise removal step, and a step of morphologically closing separate components of the crack, if necessary. Such pre-processing steps typically aim at segmenting the loaded image, e.g., to obtain a binarized image that already provides a reasonable estimate of the crack. Foreground pixels correspond to the crack; their periphery corresponds to the initial boundary of the crack. Note, foreground pixels are depicted as black pixels in the accompanying drawings, contrary to the usual convention, for the sake of depiction. The foreground and background pixels define a segmentation mask. In the present context, the boundary of the defect can be regarded as the periphery of the defect shape outlined in the segmentation mask.

This mask is then used to generate a graph of a skeletal structure of the crack. For example, a skeletonization procedure is applied, which results in a skeletal structure, or skeleton. The latter basically shows a backbone (or backbone chain, i.e., the central path) as well as outer substructures, which are connected to the backbone. A skeletonization procedure amounts to eroding the foreground objects to center lines thereof, so as to effectively generate the medial axis of such objects. Various skeletonization methods are known, which can be used in the present context. The corresponding graph is generated by extracting the line segments spanning the resulting skeleton and returning coordinates of the endpoints of such line segments. In other words, the skeletonization method associates coordinates of endpoints of connected line segments fitting the obtained skeletal structure with respective vertices of the graph and sets edges of the graph in accordance with the connected line segments to determine boundaries.

An issue with such skeletonization procedures is that, despite their convenience and rapidity, the resulting skeletal structure may not faithfully capture the medial axes of cracks of structures of interest. Still, this problem can be tackled by pruning the underlying graph, i.e., by cutting away one or more outer subgraphs corresponding to respective outer substructures of the skeleton. The pruning process relies on identifying leaf vertices of the generated graph. The identified leaf vertices and the pruning parameters determine the outer subgraphs to be cut away. This pruning, in the present context, is performed according to one or more pruning parameters, which form part of the processing parameters. Pruning the graph makes it possible to obtain a revised skeletal structure, which better captures the crack.

In embodiments, the pruning parameters determine a threshold length. The graph is pruned by removing any leaf vertex from the graph, as well as the outer edge connected thereto, if a length of this outer edge is smaller than the threshold length. The graph may be pruned recursively, by repeatedly performing a procedure that removes leaf vertices and the corresponding outer edges (in accordance with the threshold length) and subsequently identifies new leaf vertices of the graph.

In embodiments, the graph may be formed as a connected undirected graph, i.e., an undirected graph, in which any two vertices are connected by exactly one edge, corresponding to a segment of the skeleton. The graph formed is usually acyclic, except in the unlikely case of a closed crack (e.g., a disk-like crack). Such a use case, however, may not pose a problem where the graph may be pruned by identifying and removing endpoint vertices, i.e., vertices with degree 1, which correspond to vertices that are connected to only one other vertex.

In embodiments, a realistic crack may be reconstructed from both the revised skeleton (or equivalently the pruned graph) and the original image. That is, a revised boundary of the crack is obtained thanks to a procedure using both the loaded image and the revised skeletal structure as inputs. This reconstruction procedure may exploit information contained in both the initial image and the revised skeleton, e.g., to accurately label pixels of the initial image.

The present solution allows a user to quickly achieve high-quality annotations for cracks, possibly multiple cracks at the same time, simply by setting (and possibly modifying) processing parameters and running a pipeline of efficient algorithms. The proposed method can possibly be performed interactively, whereby the above pipeline is rerun (at least partly) upon the user updating the processing parameter values.

The proposed solution can be used to bootstrap annotation tasks starting from non-annotated images. In variants, the present approach can be used to refine coarse annotations, whether generated by humans or machines, to improve the annotation accuracy and an existing training dataset. In particular, the proposed approach can be used to refine existing annotations, which may then be used to train a cognitive model, such that the trained model may later be used to infer higher-quality annotations.

This novel approach is based on the observation that annotating such thin and complex shapes as material cracks takes a long time, especially when using polygon drawing tools, as done in standard annotation tools to input segmentation masks. On the contrary, simple processing algorithms such as thresholding and skeletonization algorithms do operate fast. However, their results have limited accuracy; such algorithms do typically not segment the object as intended by the user and often tend to produce too much noise. Thus, the gist of the proposed method is to exploit simple pre-processing steps to obtain a skeletal structure and subsequently trim this structure. The revised skeletal structure is then used to reconstruct realistic crack boundaries from the initial image. The proposed method is computationally fast and allows annotation times to be reduced by one order of magnitude.

The method may be devised to morphologically close distinct components of the crack, if any. To that aim, the loaded image is pre-processed by: segmenting the image to obtain a segmented image showing distinct components of the crack, where the distinct components are spatially separated; computing a scalar field based on minimal distances of pixels of the segmented image to each of the distinct components; determining a region corresponding to an extremal range of values of the scalar field (such values are bounded by a threshold value defined by a threshold parameter of the processing parameters); and morphologically closing any two components of the crack, should this region overlap with the two components. This way, the initial boundary of the crack, as used to compute the skeletal structure, is obtained as a boundary of morphologically closed components of the crack.

In embodiments, the revised boundary is obtained by classifying pixels of the loaded image, to obtain labels for the pixels, where the labels are computed based on information extracted from each of the pre-processed image and the revised skeletal structure. The revised boundary of the crack is formed according to labels obtained for the pixels of the loaded image.

In embodiments, a second pipeline is run to process a spalling in an image of a civil engineering structure. I.e., this assumes that the structural defects, which are visible in the loaded image, include a spalling, in addition to the crack. Executing the second pipeline first causes to partition the loaded image into superpixels (i.e., segments of multiple pixels). Next, feature vectors of the superpixels are computed, where each feature vector is an array of quantities obtained from properties of a respective superpixel. Finally, inferences are performed, given a segmentation label of one of the superpixels, to obtain segmentation labels of remaining superpixels based on distances between the respective feature vectors. This makes it possible to quickly obtain a reliable boundary of the spalling.

The present methods may comprise a graphical user interface (GUI), which is designed to allow a user to load an image and select values of the processing parameters, prior to running any pipeline in accordance with the processing parameters. After running a pipeline, a first time, this pipeline may possibly be rerun, at least partly, upon the user updating the processing parameters (via the GUI), to refine the boundaries of the defects. The pipeline may be performed in batch mode. For example, the structural defects may include several cracks. In that case, the first pipeline may be run in batch mode, in respect of all of the cracks, so as to obtain revised boundaries of each of the cracks based on a same set of processing parameters. The loaded image (or portions thereof) and the computed boundaries may be added to a training dataset, with a view to training a machine learning model. Such a model may then be executed to infer boundaries of cracks of new images.

Embodiments of the present methods enable a user to produce high-quality image segmentation annotations interactively and quickly, by way of computationally fast processing steps, which allow real-time updates of the results. The proposed approach drastically reduces human efforts needed for annotating images and produces high-quality output mask up to the pixel level. The GUI can be made intuitive to use and work with different initialization scenarios, e.g., from scratch, from bounding boxes, from rough polygon mask. The proposed methodology is suited for shapes as challenging as hair-line structures (e.g., cracks).

Another aspect of the invention concerns a computer program product for generating boundaries of structural defects of materials in images of structures. The computer program product comprises a computer readable storage medium having program instructions embodied therewith, where the program instructions are executable by processing means of a computerized system to cause the computerized system to perform steps of a method as described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (""CPP embodiment"" or "CPP") is a term used in the present disclosure to describe any set of one, or more, storage media (also called ""mediums"") collectively included in a set of one, or more, storage devices that collectively include machine readable code corresponding to instructions and/or data for performing computer operations specified in a given CPP claim. A ""storage device"" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Referring now to FIG. 1, computing environment 100 contains an example of an environment for the execution of at least some of the computer code involved in performing the inventive methods, such as the defect boundary identifier 108 described in further detail in 1 and 2. In addition to defect boundary identifier 108, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and defect boundary identifier 108, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in persistent storage 113 typically includes at least some of the computer code involved in performing the inventive methods, such as defect boundary identifier 108.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the defect boundary identifier 108 may be a program capable of obtaining boundaries of structural defects of materials in images of structures, such as civil engineering structures. The defect boundary identifier 108 may, when executed, cause the computing environment 100 to carry out a defect boundary identifier process 200. The defect boundary identifier process 200 may be explained in further detail below with respect to FIG. 2. In embodiments of the invention, the defect boundary identifier 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, defect boundary identifier 108 may be distributed in its operation over any number or combination of the aforementioned devices.

Figure 2:
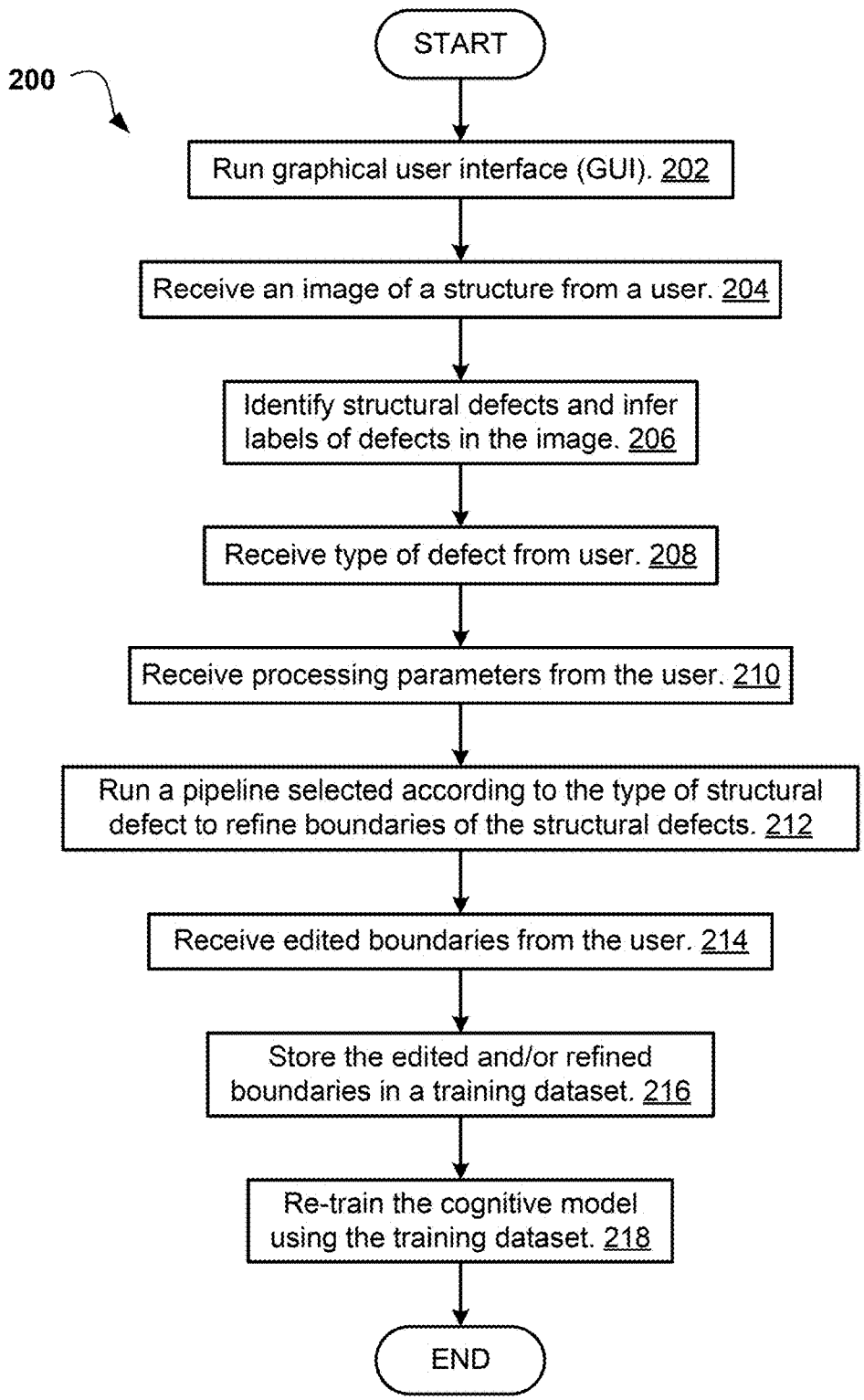
FIG. 2 is an operational flowchart illustrating a defect boundary identifier process according to at least one embodiment.

Referring now to FIG. 2, an operational flowchart illustrating a defect boundary identifier process 200 is depicted, according to at least one embodiment. At 202, the defect boundary identifier 108 executes a graphical user interface (GUI) on a computer system 100, prior to, and in view of, processing any image. This GUI may be designed to allow a user to load an image and provide inputs, starting with the selection of processing parameter values, with a view to running a pipeline in accordance with such processing parameters. The GUI may further enable drawing tools, for the user to correct the computed boundaries, if necessary.

At 204, the defect boundary identifier 108 receives an image of a structure from a user. The user may interact with the GUI to upload an image to defect boundary identifier 108. The method may potentially be applied to various types of images depicting any damaged rigid object or structure. In the following exemplary embodiments, the loaded image may be assumed to be an image of a physical structure; the structure at issue is assumed to be made of a material having one or more structural defects (e.g., including crack, rust, or spalling, for example) as routinely seen in civil engineering structures such as concrete bridges. In particular, the loaded image may show a crack.

At 206, the defect boundary identifier 108 identifies structural defects and infers labels of defects in the image. The defect boundary identifier 108 identifies structural defects and infers labels (i.e., segmentation masks) of such defects by providing the image to a trained cognitive model, which outputs the structural defects and associated labels.

At 208, the defect boundary identifier 108 receives a type of defect from the user. Here, the user may interact with the GUI to select a type of defect, such as cracks, spalling, delamination, algae, rust, et cetera, which the user desires to identify the boundaries of within the received image.

At 210, the defect boundary identifier 108 receives processing parameters from the user. The processing parameters may comprise a number of settings that govern the inputs, operating parameters, execution, et cetera of one or more pipelines. Typically, the processing parameters are initially set to default values, and can be modified by the user.

At 212, the defect boundary identifier 108 runs a pipeline selected according to the type of structural defect to refine boundaries of the structural defects. Pipelines may comprise one or more algorithms executed in sequence to perform a complex task, such as identifying boundaries of structural defects, or performing pre-processing operations on images, such as denoising and binarization. The defect boundary identifier 108 may comprise or have access to a number of different pipelines each suited to efficiently identifying boundaries of a different type of structural defect, and responsive to receiving the type of defect from the user, the defect boundary identifier 108 may select the pipeline that is best suited to detecting the boundaries of that particular structural defect. Specialized pipelines for cracks and spalling may be discussed in greater detail with respect to FIGS. 3 and 4, respectively. The defect boundary identifier 108 may execute the selected pipeline on the image to produce boundaries of the structural defect.

In some embodiments, pipelines may be run repeatedly, for example in response to receiving a user selection of an updated value of one or more of the processing parameters via the GUI. This updated value may refine the boundary (or mask) of a crack or spalling. Pipelines may be run in batch mode, whereby changing one processing parameter value impacts the segmentation masks of all cracks or all spalling. The defect boundary identifier 108 may execute multiple different pipelines in parallel or in an intermingled fashion, for example where several types of defects are present in the image, in accordance with user interactions with the GUI.

At 214, the defect boundary identifier 108 receives edited boundaries from the user. Here, the user may interact with the GUI to manually refine the boundaries to correct any deficiencies or improve the detected boundaries; such manual refinement may allow users to precisely annotate structural defects, whether cracks or spalling, and may enable the defect boundary identifier 108 to improve its boundary detection in the future by refining its training data.

At 216, the defect boundary identifier 108 stores the edited and/or refined boundaries in a training dataset. Here, the defect boundary identifier 108 stores the boundaries produced by the pipeline and any edits or refinements made by users in a training dataset. For example, the defect boundary identifier 108 may add the loaded image (or a portion thereof) to the training data, together with the revised defect boundaries.

At 218, the defect boundary identifier 108 re-trains the cognitive model using the training dataset. Here, the defect boundary identifier 108 re-trains the cognitive model using the training dataset, based on duly formed examples, i.e., associations of images (or image portions) of structures with corresponding defect boundaries. The resulting, trained machine learning model can then be used to infer boundaries of cracks of materials in (previously unseen) images of structures. In embodiments, such cognitive models may be used to infer boundaries (or segmentations masks) of defects upon starting a new session, to provide initial estimates of structural defects to the user, who may then, for example, refine such estimates manually, or by use of pipelines.

Figure 3:
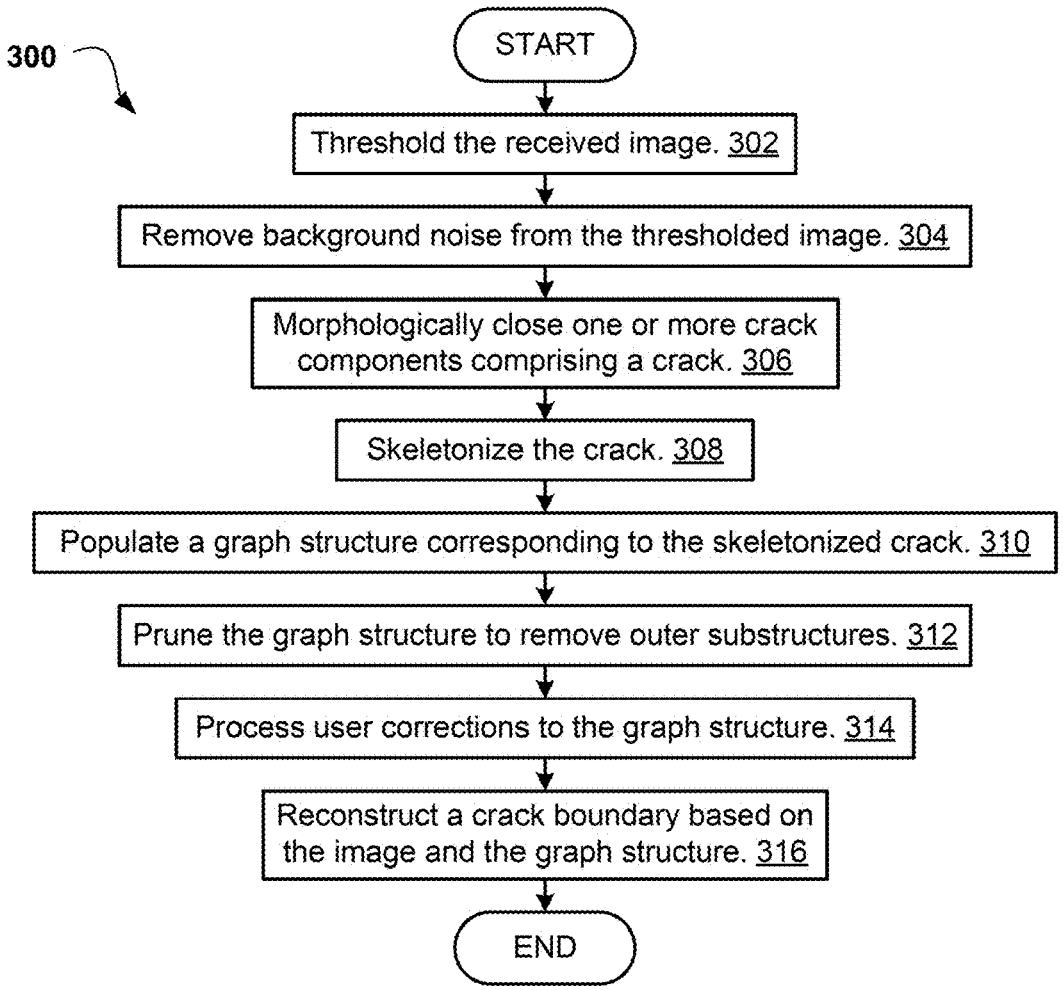
FIG. 3 is an operational flowchart further illustrating a sub-step of the defect boundary identifier process comprising a pipeline devised to process cracks, according to at least one embodiment.

Referring now to FIG. 3, an operational flowchart further illustrating a sub-step 214 of the defect boundary identifier process 200 comprising a pipeline 300 devised to process cracks is depicted, according to at least one embodiment. At 302, defect boundary identifier 108 thresholds the received image. The loaded image may be pre-processed by segmenting the image. Segmenting the image may be achieved by binarizing the loaded image, which leads to a binarized image; the resulting image shows background pixels (depicted as white pixels in the accompanying drawings) and foreground pixels (black pixels). The image may be binarized by adaptively thresholding the image according to a threshold parameter, which may be derived from the processing parameters provided by the user.

At 304, the defect boundary identifier 108 removes background noise from the thresholded image. The defect boundary identifier 108 may denoise (i.e., clean) the image by removing noise therefrom according to a noise removal parameter (which may comprise the processing parameters provided by the user), which determines, for example, a maximal number of pixels per feature to be potentially removed. Accordingly, in embodiments, the defect boundary identifier 108 may obtain the segmentation mask used to skeletonize the crack based on an image that is both binarized and denoised.

At 306, the defect boundary identifier 108 morphologically closes one or more crack components comprising a crack. In embodiments, the foreground pixels of the thresholded and/or denoised image may happen to show distinct components of the crack. That is, such components may appear to be spatially separated, although they actually form part of a same crack. Therefore, it may be advantageous to morphologically close such components. Several morphological closing procedures are known, which may potentially be used in the present context.

In embodiments, the morphological closing procedure may entail computing a scalar field based on minimal distances of pixels of the segmented image to each of the distinct components of the cracks. Then, one or more regions are determined, where each region corresponds to an extremal range of values of the computed scalar field. For example, each region may correspond to a lower range or an upper range of values, the range depending on the formulation of the scalar field. In both cases, the values of such regions are bounded by a threshold value defined by a threshold parameter, again potentially comprising part of the processing parameters provided by the user. That is, the threshold parameter determines the size of the determined regions. An extremal region may be delimited by a closed contour unless the disconnection happens to be at a periphery of the image.

In embodiments, the scalar field may possibly be obtained by summing minimal distances from the sole background pixels. For example, the sum may be limited to the background pixels only, whereby the scalar field is only evaluated at the background pixel locations, meaning that the values of the scalar field at the foreground positions are ignored. In some embodiments, defect boundary identifier 108 may simply consider all pixels. For example, the scalar field may be computed on the entire image, whereby the scalar field is obtained by summing the minimal distances from each pixel of the segmented image (including the foreground pixels) to each of the distinct components.

In embodiments, the scalar field may for instance be simply defined as the sum of the minimal distances from each pixel of the segmented image (whether including the foreground pixels or not) to each of the distinct components of the crack. For example, the scalar field $S(x, y)$ can be written as $S(x, y)=\Sigma_i^N d_{min}(C_i, P(x, y))$, where $d_{min}(C_i, P(x, y))$ measures the minimal distance between pixel $P(x, y)$ at the position x, y in the image and the component $C_i$. Such distances are summed over the N components. Using the above formulation, the regions determined must correspond to a lower range of values of the scalar field; such values are bounded from above by the threshold value. The distinct components are then connected by identifying the smallest region of the scalar field that connect such components, provided that this smallest region is still bounded by a contour value defined by the threshold value. The defect boundary identifier 108 may finally recompose the crack by morphologically closing any two apparent components thereof, should any of the extremal regions overlap with such components. The morphological closing process may be discussed in greater detail with respect to FIGS. 8-10.

At 308, the defect boundary identifier 108 skeletonizes the crack. In some embodiments, the defect boundary identifier 108 may obtain the initial segmentation mask, as used by the subsequent skeletonization procedure, based on morphologically closed components of the crack. Various skeletonization procedures may be used to generate a skeletal structure. The skeletal structure may already be represented by connected line segments, as per an output of the skeletonization algorithm. If not, the defect boundary identifier 108 may determine suitable line segments by fitting line segments into the skeletal structure (e.g., a pixel-thin mask) returned by the skeletonization algorithm. Next, coordinates of endpoints of the connected line segments are associated with respective vertices of the graph. Finally, the edges of the graph are set in accordance with the connected line segments.

At 310, the defect boundary identifier 108 populates a graph structure corresponding to the skeletonized crack. The graph can, for instance, be generated by populating values of a data structure, where the populated values relate to edges connecting pairs of vertices and vertex positions (i.e., the endpoint coordinates, which are associated with vertices of the graph).

At 312, the defect boundary identifier 108 prunes the graph structure to remove outer substructures. The graph can then be pruned by deleting subgraphs that correspond to outer substructures. Once a suitable graph representation has been obtained, the graph is pruned by cutting away subgraphs that correspond to respective outer substructures of the skeleton, to obtain a revised skeletal structure. The outer structures are dangling structures that are connected to the backbone. The extent to which the corresponding subgraphs are removed is governed by the pruning parameters and the pruning algorithm.

In embodiments, the pruning algorithm does not explicitly need to identify the central path (i.e., the backbone) of the crack. Rather, it may be sufficient to identify dead ends corresponding to leaf vertices, i.e., vertices with degree 1, meaning that such vertices are connected to only one vertex of the graph. To that aim, defect boundary identifier 108 may first identify leaf vertices of the generated graph. In turn, the identified leaf vertices determine, together with the pruning parameters, the outer subgraphs that will be cut away, i.e., the extent to which the graph will be pruned.

In embodiments, a simple pruning approach is to rely on a threshold length of edges connecting dead ends (leaf vertices) to the rest of the graph. That is, the one or more pruning parameters determine a threshold length, and the graph is pruned by removing any leaf vertex (among the previously identified leaf vertices), as well as the outer edge connected thereto, should the length of this outer edge be smaller than the threshold length. Such a pruning process, however, only removes the sub-critical, outermost segments. Now, in that case, it may be advantageous to recursively prune the graph, by repeating the same process. As a result, outer segments keep on being removed as long as they are determined to have a sub-critical length, although the number of iterations may be restricted. More precisely, the graph may be pruned by repeatedly performing the following two steps: first, some leaf vertices (and the outer edges connected thereto) are removed, in accordance with the threshold length. Second, new leaf vertices are identified. This way, every outer segment that is less than the threshold length will be cut away during the next iteration. The process repeats until not more critical leaf vertex is identified. For example, the residual leaf vertices may all be connected by an edge that is larger than the threshold length. Alternatively, the process repeats a certain number of times. However, the recursive pruning scheme does not remove long edges. Rather, the recursive pruning resolves regions where many small edges are connected.

Several variants to the above pruning algorithm can be contemplated. For instance, outer structures may possibly be removed outright, based on pruning parameters relating to an absolute threshold dimension for the outer substructures (e.g., a threshold radius), or a relative dimension, e.g., relative to a dimension of an internal structure, such e.g., a length of the central path, for example. In that respect, the pruning algorithm may for instance try to first identify a central path of the graph as the longest path of the graph. The longest path is a path graph, i.e., a finite sequence of edges joining a finite sequence of distinct vertices spanning the crack. Next, sub-critical, outer substructures can be removed outright, should their dimension be less than a threshold dimension set by the user (or by default).

At 314, the defect boundary identifier 108 processes user corrections to the graph structures. If necessary, the user may manually correct the skeletal structure obtained, by removing residual dangling structures or adding missing structures, if necessary, using a drawing tool integrated into the GUI.

At 316, the defect boundary identifier 108 reconstructs a crack boundary based on the image and the graph structure.

The defect boundary identifier 108 uses both the image (as initially loaded or, if necessary, lightly preprocessed) and the revised skeletal structure to reconstruct the crack boundary. In embodiments, the revised boundary is obtained by classifying pixels of the loaded image to obtain labels for such pixels. Such labels are computed based on information extracted from each of the pre-processed image and the revised skeletal structure. The revised boundary of the crack is formed according to the labels obtained for the pixels of the loaded image.

The label classification may be performed as follows: in some embodiments where the loaded image has been binarized to show background pixels and foreground pixels, the foreground pixels may define an estimate of the crack. If necessary, the binarized image may further have been denoised and morphologically closed. The pixels of the loaded image can be classified by first building a trimap of the loaded image, where the trimap includes three categories of pixels, namely the confirmed background pixels, the confirmed foreground pixels, and remaining pixels, which are to be classified. The pixels of the loaded image that correspond to background pixels of the preprocessed image can be labelled as confirmed background pixels (first category of pixels), since they do not form part of the crack. Moreover, the pixels of the loaded image that correspond to pixels of the revised skeletal structure can be labelled as confirmed foreground pixels (second category of pixels), given that they belong to the skeletal structure. The remaining pixels, however, must still be classified as foreground pixels or background pixels. Thus, a classification is performed, by exploiting information from both the initial image and the revised skeleton, to obtain labels for all the pixels of the loaded image. The revised boundary of the crack is obtained as a boundary of those pixels that end up being labelled as foreground pixels.

In some embodiments, the defect boundary identifier 108 may use a quadmap, instead of a trimap, for practical reasons. For example, the last category of the trimap is subdivided into two categories, respectively corresponding to pixels initialized to probable background and probable foreground pixels. This makes it possible to initialize the classification algorithm. The classification algorithm may for instance be devised in an analogous manner as the so-called GrabCut algorithm. This algorithm works on a Gaussian mixture model over the estimated color distributions and segments based on a graph min-cut optimization algorithm. However, here a customized mask is used as input, instead of a bounding box. Other segmentation algorithms may be contemplated, provided that such algorithms accept a customized mask as input.

Figure 4:
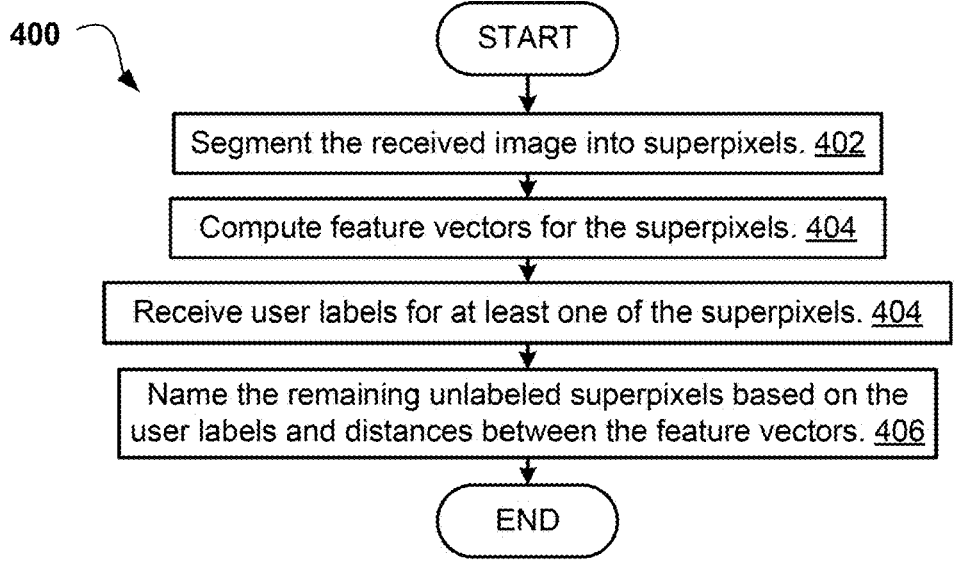
FIG. 4 is an operational flowchart further illustrating a sub-step of the defect boundary identifier process comprising a pipeline devised to process spalling, according to at least one embodiment.
Figure 5:
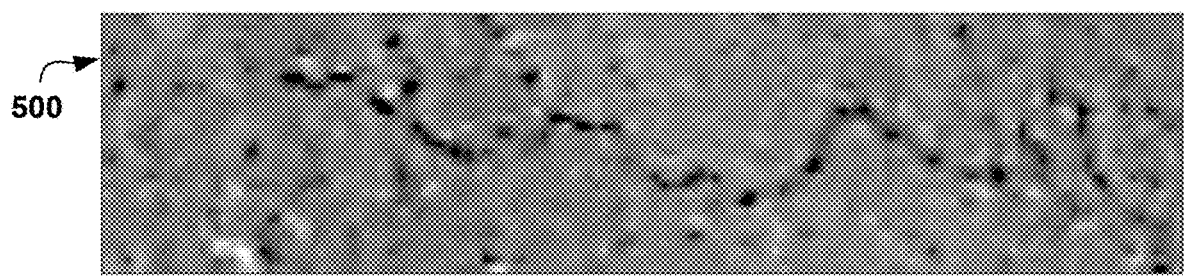
FIG. 5 illustrates a loaded image depicting a crack according to at least one embodiment.

Referring now to FIG. 4, an operational flowchart further illustrating a sub-step 214 of the defect boundary identifier process 200 comprising a pipeline 400 devised to process spalling is depicted, according to at least one embodiment. At 402, the defect boundary identifier 108 segments the received image into superpixels. The defect boundary identifier 108 may partition the loaded image (or a portion thereof) into superpixels, which comprise segments of multiple pixels. The superpixel segmentation divides the loaded image into semantically meaningful regions.

At 404, the defect boundary identifier 108 computes feature vectors for the superpixels. Each feature vector is a 1D array of quantities obtained from properties of the respective superpixel. This array may for instance include quantities relating to centroid coordinates and color properties of the respective superpixel. For example, each feature vector can be composed as a vector F={$R_{avg}$, $G_{avg}$, $B_{avg}$, $x_{centroid}$, $y_{centroid}$}, where the $R_{avg}$, $G_{avg}$, and $B_{avg}$ values are average RGB intensity values of the superpixel concerned, while $x_{centroid}$, $y_{centroid}$ are the 2D centroid coordinate of this superpixel. The small dimension of the resulting vector allows meaningful distances to be computed (e.g., as Euclidean distances) between the superpixels, without suffering from dimensionality issues. Such a feature engineering may result in vectors that separate well in the feature space.

At 406, the defect boundary identifier 108 receives user labels for at least one of the superpixels. Here, minimal human inputs are used to run a semi-supervised algorithm and improve the labelling. E.g., within 4 to 6 clicks on superpixels, the user switches the corresponding labels, as necessary, which triggers an automatic re-labelling of the remaining superpixels. Finally, the user may manually fine-tune S165a the superpixels, if necessary. In some embodiments of the invention, no human may be needed, and initial labeling may for instance be achieved by initially assigning labels "foreground" and "background" to the superpixels, simply based on distances between the respective vectors.

At 408, the defect boundary identifier 108 names the remaining unlabeled superpixels based on the user labels and distances between the feature vectors. Thus, given a segmentation label of one or more of the superpixels (e.g., selected by the user), the method may properly infer segmentation labels of remaining superpixels, simply based on distances obtained between the respective feature vectors. This makes it possible to efficiently obtain a suitable boundary of the spalling, or even a segmentation mask.

Figure 6:
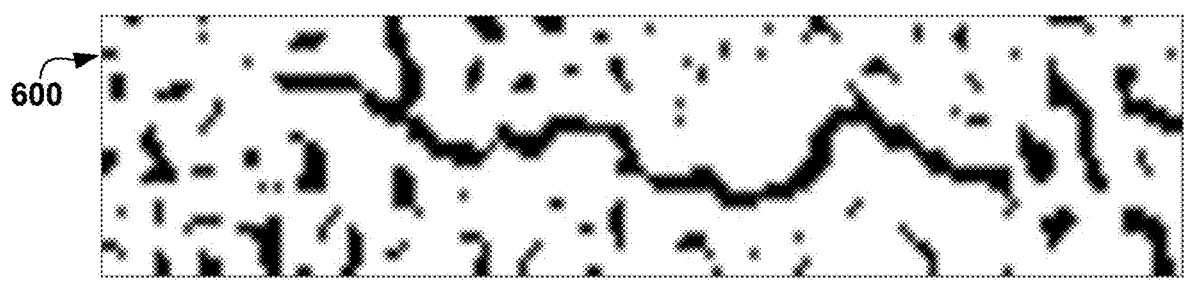
FIG. 6 illustrates a binarized version of the loaded image according to at least one embodiment.
Figure 7:
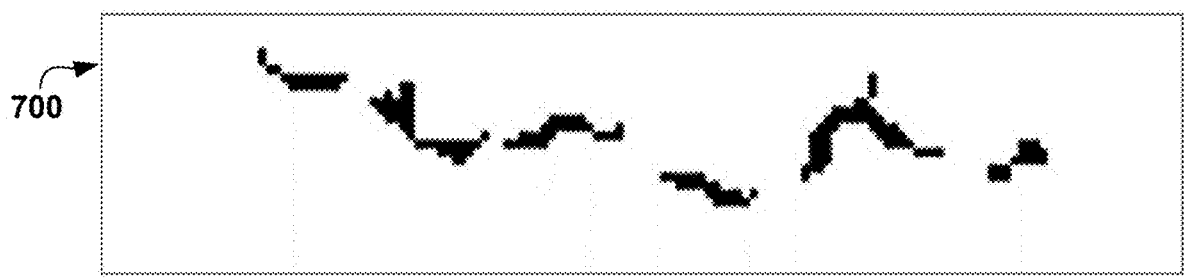
FIG. 7 illustrates a denoised version of the binarized image according to at least one embodiment.
Figure 8:
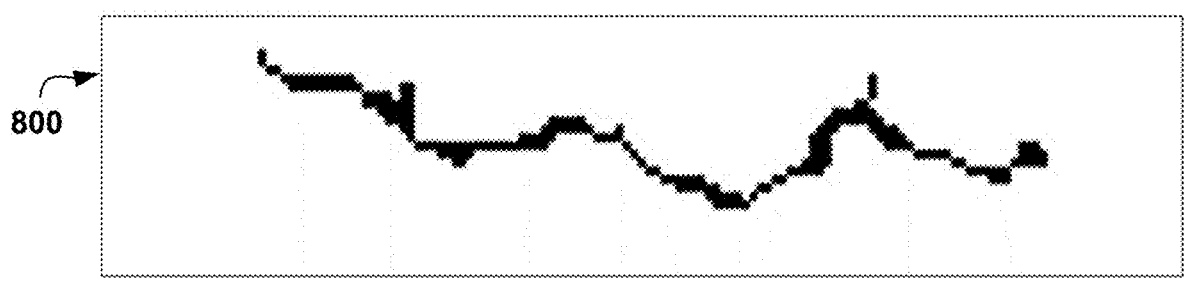
FIG. 8 illustrates a version of the denoised image with components of the crack morphologically closed according to at least one embodiment.

Referring now to FIGS. 5-8, a loaded image depicting a crack 500 is depicted according to at least one embodiment. FIG. 6 depicts a version 600 of the loaded image 500 that has been subjected to a binarization process according to at least one embodiment, which is black and white as opposed to the gray of the original image 500. FIG. 7 depicts a version 700 of the loaded image 500 that has been subjected to a denoising, or cleaning, process according to at least one embodiment that removes non-crack elements and leaves only details that correspond with the crack. FIG. 8 depicts a version 800 of the loaded image 500 that has been subjected to a morphologic closing process according to at least one embodiment, and the space between cracks visible in denoised image 700 have been filled in such that the crack is now a single contiguous feature.

Figure 9:
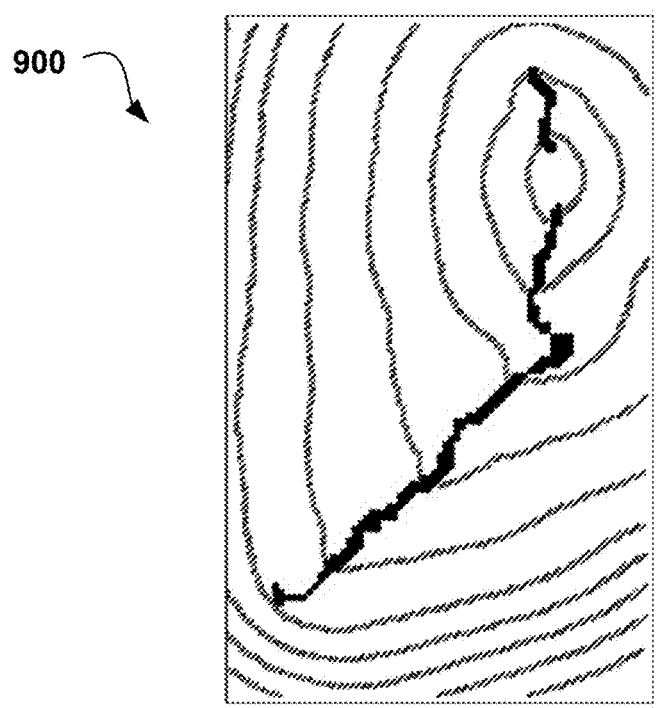
FIG. 9 illustrates an image depicting a crack overlaid with contour lines corresponding to a morphological closing process according to at least one embodiment.

Referring now to FIG. 9, an image 900 depicting a crack overlaid with contour lines corresponding to a morphological closing process is depicted according to at least one embodiment. Here, contour lines (depicted as diagonal stripes) of a scalar field computed by summing minimal distances from each pixel of the entire image to each of the two crack components (in black) are overlaid over the image 900. The two components overlap with the region bounded by the smallest contour, indicating that such components should be morphologically closed, as per the current threshold value.

Figure 10:
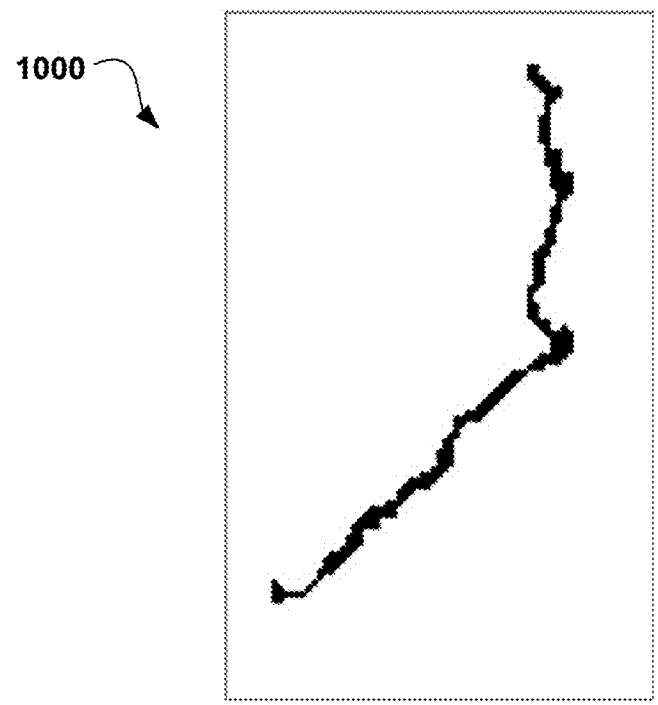
FIG. 10 illustrates the image depicting a crack after a morphological closing process has been performed on the image, according to at least one embodiment.
Figure 11:
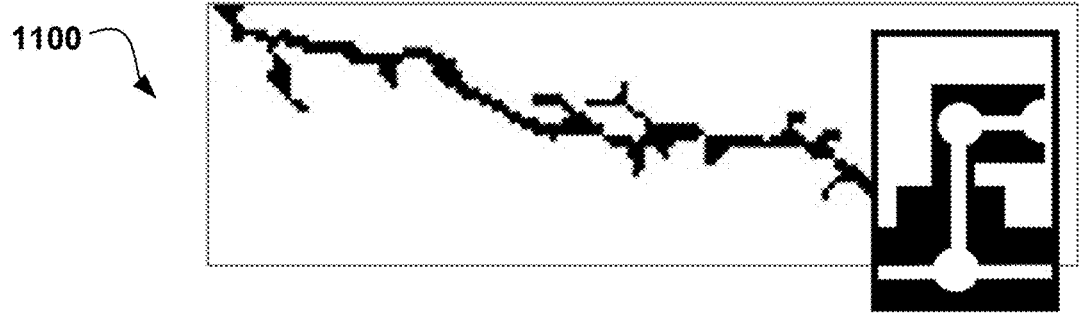
FIG. 11 depicts an image of line segments spanning a skeleton representing a crack in an initial stage of a skeletonization procedure, according to at least one embodiment.

Referring now to FIG. 10, the image 1000 depicting a crack is here depicted after a morphological closing process has been performed on the image, according to at least one embodiment. The result of the morphological closing operation is shown with respect to FIG. 10. Distinct components can be closed by a mere line segment connecting them, although more sophisticated methods can be used.

Figure 12:
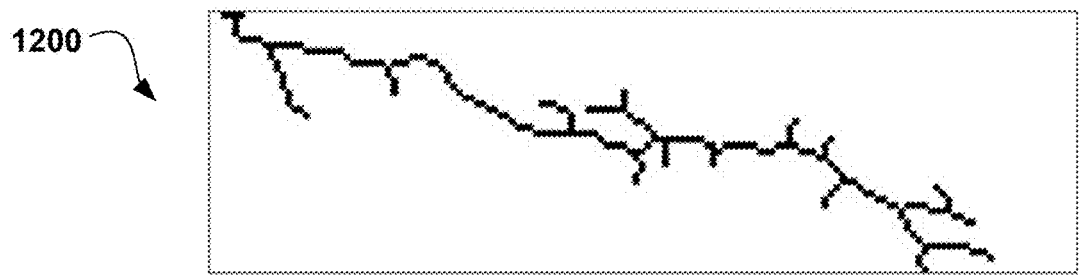
FIG. 12 depicts the image of line segments representing a crack after the crack has been eroded to its center lines as part of a skeletonization procedure, according to at least one embodiment.
Figure 13:
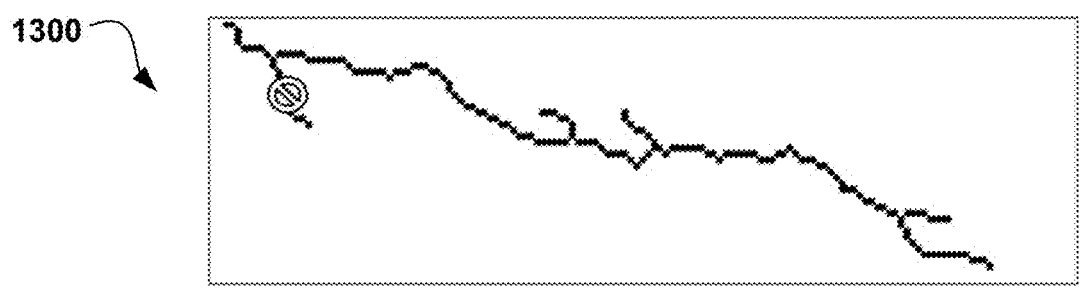
FIG. 13 depicts the image of line segments representing a crack undergoing a pruning process as part of the skeletonization procedure, according to at least one embodiment.
Figure 14:
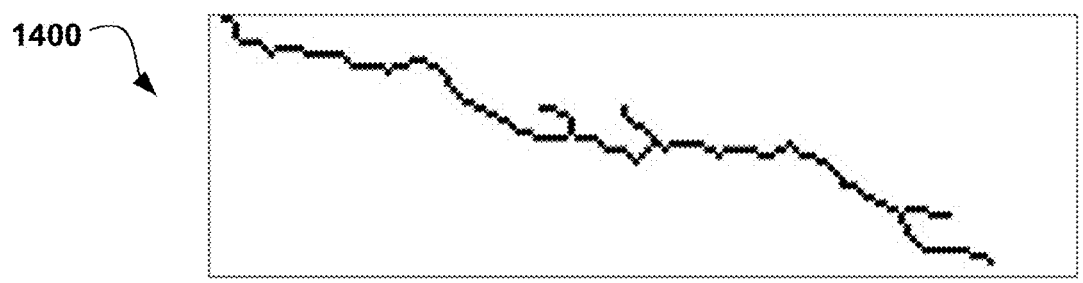
FIG. 14 depicts the image of line segments representing a crack after undergoing a pruning process as part of the skeletonization procedure, according to at least one embodiment.

Referring now to FIGS. 11-14, FIG. 11 depicts an image 1100 of line segments spanning a skeleton representing a crack in an initial stage of a skeletonization procedure, according to at least one embodiment. FIG. 12 depicts the image 1200 of line segments representing a crack after the crack has been eroded to its center lines as part of a skeletonization procedure, according to at least one embodiment. FIG. 13 depicts the image 1300 of line segments representing a crack undergoing a pruning process as part of the skeletonization procedure, according to at least one embodiment. FIG. 14 depicts the image 1400 of line segments representing a crack after undergoing a pruning process as part of the skeletonization procedure, according to at least one embodiment.

Figure 15:
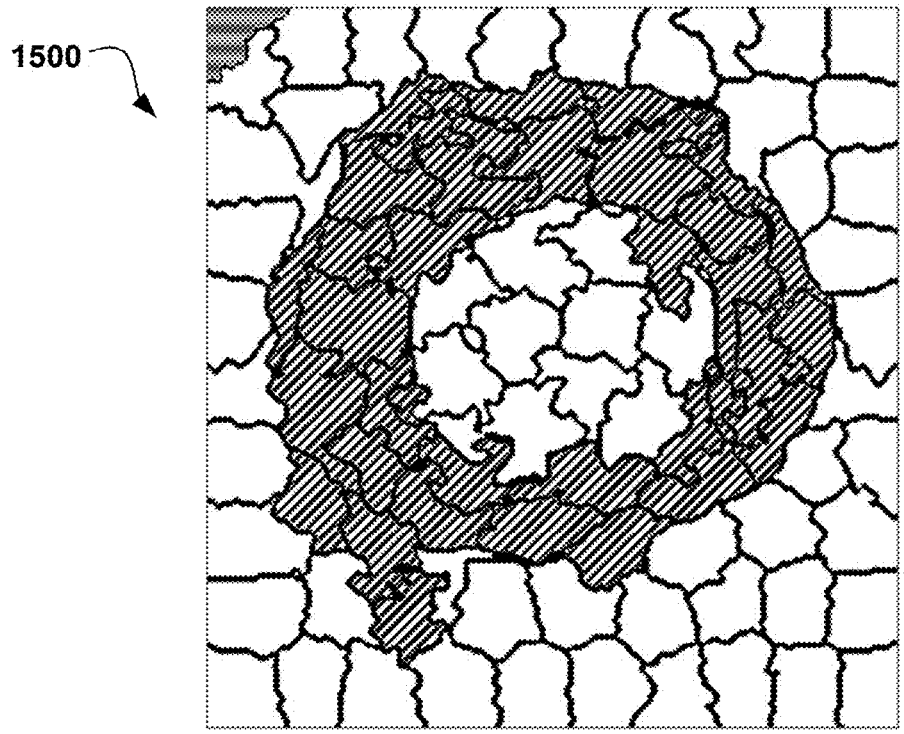
FIG. 15 depicts an image of structural spalling partitioned into a plurality of superpixels, according to at least one embodiment.
Figure 16:
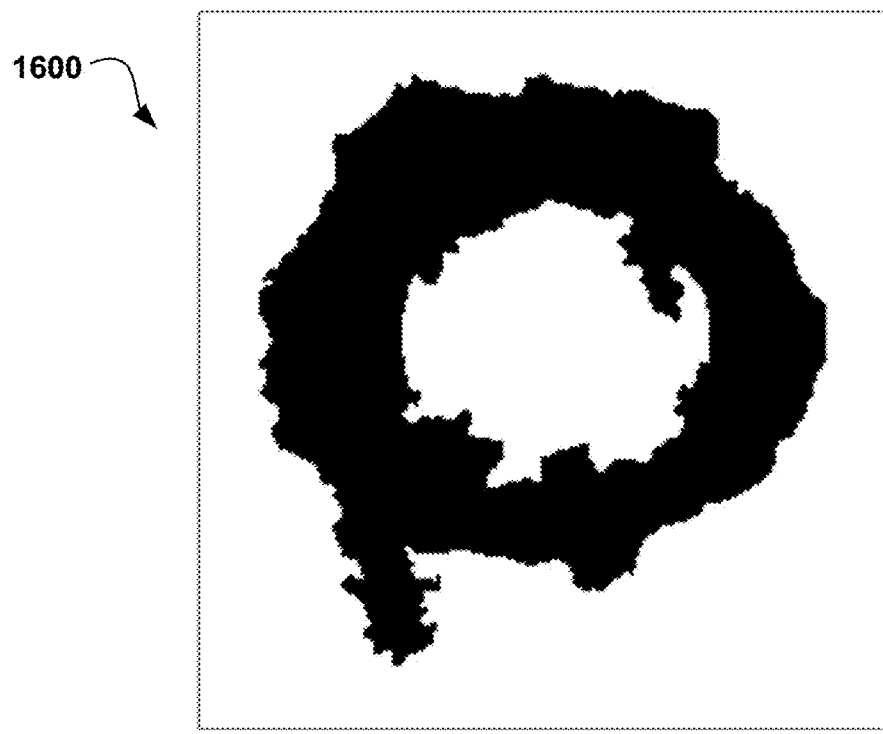
FIG. 16 depicts the image of structural spalling where the superpixels have been used to identify a boundary of the spalling, according to at least one embodiment.

Referring now to FIGS. 15-16, FIG. 15 depicts an image 1500 of structural spalling partitioned into a plurality of superpixels, according to at least one embodiment. FIG. 16 depicts the image 1600 of structural spalling where the superpixels have been used to identify a boundary of the spalling, according to at least one embodiment.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention is not limited to the particular embodiments disclosed, but that the present invention will include all embodiments falling within the scope of the appended claims. In addition, many other variants than explicitly touched above can be contemplated. For example, additional preprocessing steps may be involved.

What is claimed is:

1. A computer-implemented method of obtaining boundaries of structural defects of materials in images of structures, wherein the method comprises:
   loading an image of a structure made of a material having one or more structural defects, these including a crack; and
   running a pipeline according to processing parameters, wherein the pipeline comprises:
      pre-processing the loaded image to obtain an initial segmentation mask defining an initial boundary of the crack;
      based on the initial segmentation mask obtained, generating a graph of a skeletal structure of the crack, wherein the skeletal structure has a backbone and outer substructures connected to the backbone;
      pruning the graph by cutting away one or more outer subgraphs corresponding to respective ones of the outer substructures, according to one or more pruning parameters of the processing parameters, to obtain a revised skeletal structure;
      labelling a plurality of pixels comprising the loaded image and corresponding to a plurality of background pixels of the pre-processed loaded image as confirmed background pixels;
      labelling a plurality of the pixels corresponding to pixels of the revised skeletal structure as confirmed foreground pixels; and
      obtaining a revised boundary of the crack based on the confirmed background pixels and the confirmed foreground pixels.

2. The computer-implemented method according to claim 1, wherein generating the graph comprises running a skeletonization algorithm to obtain the skeletal structure, associate coordinates of endpoints of connected line segments fitting the obtained skeletal structure with respective vertices of the graph, and set edges of the graph in accordance with the connected line segments, and wherein pruning the graph further comprises identifying one or more leaf vertices of the generated graph, wherein the one or more identified leaf vertices and the one or more pruning parameters determine the one or more outer subgraphs to be cut away.

3. The computer-implemented method according to claim 2, wherein the one or more pruning parameters determine a threshold length, and wherein the graph is pruned by removing any leaf vertex of the one or more identified leaf vertices from the graph, as well as an outer edge connected to said any leaf vertex, if a length of said outer edge is smaller than said threshold length.

4. The computer-implemented method according to claim 3, wherein the graph is pruned recursively, by repeatedly removing the one or more identified leaf vertices and outer edges from the graph, in accordance with said threshold length, and subsequently identifying one or more new leaf vertices of the graph.

5. The computer-implemented method according to claim 1, wherein pre-processing the loaded image comprises:
   segmenting the loaded image to obtain a segmented image showing distinct components of the crack, wherein the distinct components are spatially separated;
   computing a scalar field based on minimal distances of pixels of the segmented image to each of the distinct components;
   determining one or more regions, each corresponding to an extremal range of values of the computed scalar field, wherein such values are bounded by a threshold value defined by a threshold parameter of the processing parameters; and
   morphologically closing any two components of said distinct components, should any region of said one or more regions overlap with said any two components, whereby the initial boundary of the crack is obtained as a boundary of the morphologically closed components of the crack.

6. The computer-implemented method according to claim 5, wherein:
   the pixels of the segmented image comprised background pixels and foreground pixels, the latter corresponding to the distinct components of the crack;
   the scalar field is obtained by summing the minimal distances from each pixel of at least the background pixels of the segmented image to each of the distinct components; and
   the one or more regions determined correspond to a lower range of values of the scalar field, the lower range of values bounded from above by said threshold value.

7. The computer-implemented method according to claim 6, wherein the scalar field is obtained by summing the minimal distances from each pixel of the pixels of the segmented image to each of the distinct components.

8. The computer-implemented method according to claim 1, wherein the revised boundary is obtained by:
   classifying pixels of the loaded image, to obtain labels for the pixels, wherein the labels are computed based on information extracted from each of the pre-processed image and the revised skeletal structure; and forming the revised boundary of the crack according to the labels obtained for the pixels of the loaded image.

9. The computer-implemented method according to claim 8, wherein pre-processing the loaded image comprises binarizing the loaded image to obtain a binarized image including background pixels and foreground pixels, the latter defining an estimate of the crack; and wherein classifying the pixels of the loaded image comprises:

building a trimap of the loaded image, wherein:
pixels of the loaded image corresponding to background pixels of the binarized image are labelled as background pixels;
pixels of the loaded image corresponding to pixels of the revised skeletal structure are labelled as foreground pixels; and
remaining pixels of the loaded image, wherein the remaining pixels are to be classified as the foreground pixels or the background pixels; and classifying the remaining pixels as the foreground pixels or the background pixels, to obtain the labels for all the pixels of the loaded image, whereby the revised boundary of the crack is obtained as a boundary of the pixels of the loaded image that are labelled as the foreground pixels.

10. The computer-implemented method according to claim 1, wherein pre-processing the loaded image comprises:

adaptively thresholding the loaded image according to a threshold parameter of the processing parameters to obtain a binarized image, whereby the initial boundary of the crack is obtained based on the binarized image.

11. The computer-implemented method according to claim 10, wherein pre-processing the loaded image further comprises:

cleaning the binarized image by removing noise therefrom, based on a noise removal parameter of the processing parameters, the noise removal parameter determining a maximal number of pixels per feature to be potentially removed, whereby the initial boundary of the crack is obtained based on the cleaned image.

12. The computer-implemented method according to claim 1, wherein:

the structures are civil engineering structures;
the one or more structural defects include several structural defects, which include a spalling, in addition to the crack;
said pipeline is a first pipeline; and
the method further comprises executing a second pipeline, which comprises:
partitioning the loaded image into superpixels, the latter comprising segments of multiple pixels;
computing feature vectors of the superpixels, where each of the feature vectors is an array of quantities obtained from properties of a respective superpixel of the superpixels; and
given a segmentation label of at least one of the superpixels, inferring segmentation labels of remaining ones of the superpixels based on distances between respective ones of the feature vectors, so as to obtain a boundary of the spalling.

13. The computer-implemented method according to claim 12, wherein:

said array of quantities include quantities relating to coordinates of a centroid of the respective superpixel and color properties of the respective superpixel.

14. The computer-implemented method according to claim 1, wherein the method further comprises:

executing a graphical user interface, or GUI, prior to loading said image, wherein the GUI is designed to allow a user to load said image; and
receiving, via the GUI, a user selection of a value of one or more of the processing parameters, prior to running the pipeline in accordance with the processing parameters.

15. The computer-implemented method according to claim 14, wherein the method further comprises:

responsive to running the pipeline, rerunning the pipeline, at least partly, upon receiving a user selection of an updated value of one or more of the processing parameters, via the GUI, to obtain a further revised boundary of the crack taking into account the updated value received.

16. The computer-implemented method according to claim 14, wherein:

the one or more structural defects include several structural defects, which include several cracks, these including said crack; and
the pipeline is run in batch mode, in respect of all of the several cracks, so as to obtain revised boundaries of each of the several cracks.

17. The computer-implemented method according to claim 14, wherein the method further comprises:

enabling a user to edit the revised skeletal structure by selecting a substructure thereof, via the GUI.

18. The computer-implemented method according to claim 1, wherein the method further comprises:

adding at least a portion of the loaded image and the revised boundary to a training dataset of a machine learning pipeline; and
training a machine learning model on the training dataset, based on associations of images of structures with crack boundaries, to obtain a trained machine learning model that is adapted to infer boundaries of cracks of materials in images of structures.

19. A computer system for generating boundaries of structural defects of materials in images of structures, the computer system comprising:

one or more processors, one or more computer readable memories, one or more computer readable tangible storage media;
program instructions, stored on at least one of the one or more tangible storage media for execution by at least one of the one or more processors via at least one of the one or more memories, to load an image of a structure made of a material having one or more structural defects, these including a crack; and
program instructions, stored on at least one of the one or more tangible storage medium for execution by at least one of the one or more processors via at least one of the one or more memories, to run a pipeline according to processing parameters, wherein running the pipeline comprises:
pre-processing the loaded image to obtain an initial segmentation mask defining an initial boundary of the crack;
based on the initial segmentation mask obtained, generating a graph of a skeletal structure of the crack, wherein the skeletal structure has a backbone and outer substructures connected to the backbone;
pruning the graph by cutting away one or more outer subgraphs corresponding to respective ones of the outer substructures, according to one or more pruning parameters of the processing parameters, to obtain a revised skeletal structure;

labelling a plurality of pixels comprising the loaded image and corresponding to a plurality of background pixels of the pre-processed loaded image as confirmed background pixels;

labelling a plurality of the pixels corresponding to pixels of the revised skeletal structure as confirmed foreground pixels; and obtaining a revised boundary of the crack based on the confirmed background pixels and the confirmed foreground pixels.

20. A computer program product for generating boundaries of structural defects of materials in images of structures, the computer program product comprising:

one or more computer readable tangible storage media;

program instructions, stored on at least one of the one or more storage media, to load an image of a structure made of a material having one or more structural defects, these including a crack; and program instructions, stored on at least one of the one or more storage media, to run a pipeline according to processing parameters, wherein running the pipeline comprises:

pre-processing the loaded image to obtain an initial segmentation mask defining an initial boundary of the crack;

based on the initial segmentation mask obtained, generating a graph of a skeletal structure of the crack, wherein the skeletal structure has a backbone and outer substructures connected to the backbone;

pruning the graph by cutting away one or more outer subgraphs corresponding to respective ones of the outer substructures, according to one or more pruning parameters of the processing parameters, to obtain a revised skeletal structure;

labelling a plurality of pixels comprising the loaded image and corresponding to a plurality of background pixels of the pre-processed loaded image as confirmed background pixels;

labelling a plurality of the pixels corresponding to pixels of the revised skeletal structure as confirmed foreground pixels; and obtaining a revised boundary of the crack based on the confirmed background pixels and the confirmed foreground pixels.

* * * * *